F. H. ROYCE.
ENGINE MOUNTING FOR MOTOR VEHICLES.
APPLICATION FILED NOV. 25, 1913.

1,108,242.

Patented Aug. 25, 1914.

WITNESSES

INVENTOR
F. H. Royce.
per Percy H. Moore
Attorney.

UNITED STATES PATENT OFFICE.

FREDERICK HENRY ROYCE, OF DERBY, ENGLAND.

ENGINE-MOUNTING FOR MOTOR-VEHICLES.

1,108,242.   Specification of Letters Patent.   Patented Aug. 25, 1914.

Application filed November 25, 1913. Serial No. 802,939.

*To all whom it may concern:*

Be it known that I, FREDERICK HENRY ROYCE, a subject of the King of Great Britain and Ireland, residing at Nightingale Road, Osmaston Road, Derby, in the county of Derby, England, have invented a certain new and useful Engine-Mounting for Motor-Vehicles, of which the following is a specification.

This invention relates to the mounting of engines in motor vehicles, and particularly to that method in which the engine is free to rock about a longitudinal axis and in which said movement is controlled by springs, and it has for its object more efficiently to prevent vibration caused by the reaction of the engine being transmitted to the side members of the frame.

According to the present invention, the movement of the engine about its longitudinal axis—which is preferably located so as to pass through or approximately through the center of gravity of the engine—is controlled both by springs and by frictional or other damping devices operating between the engine and the frame so that before any vibration arising from the reaction of the engine can be transmitted to the side members of the frame it must first pass through both the springs and the friction dampers, whereby its effect on the side members of the frame is very considerably reduced.

Figure 1:
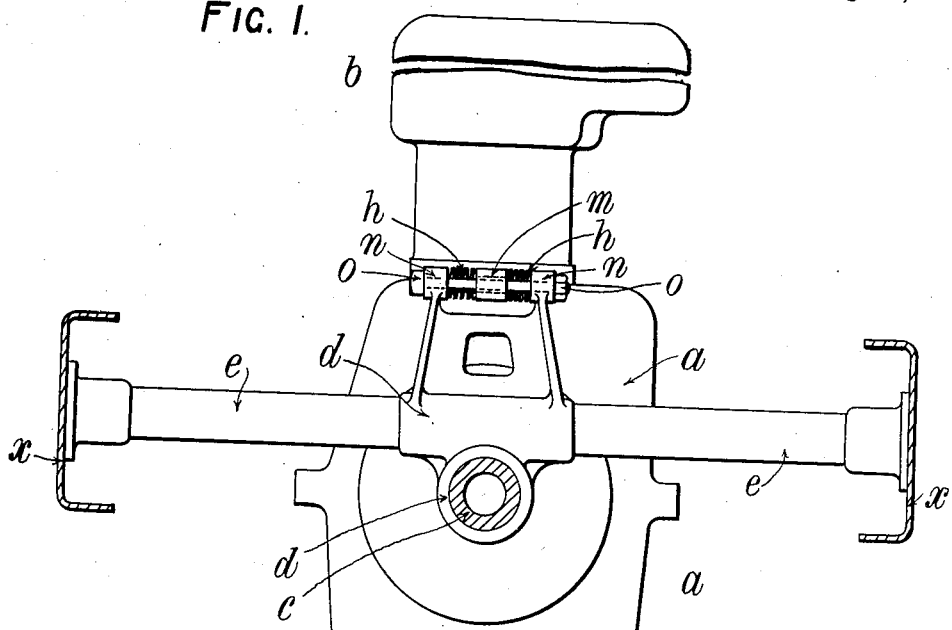
Figure 2:
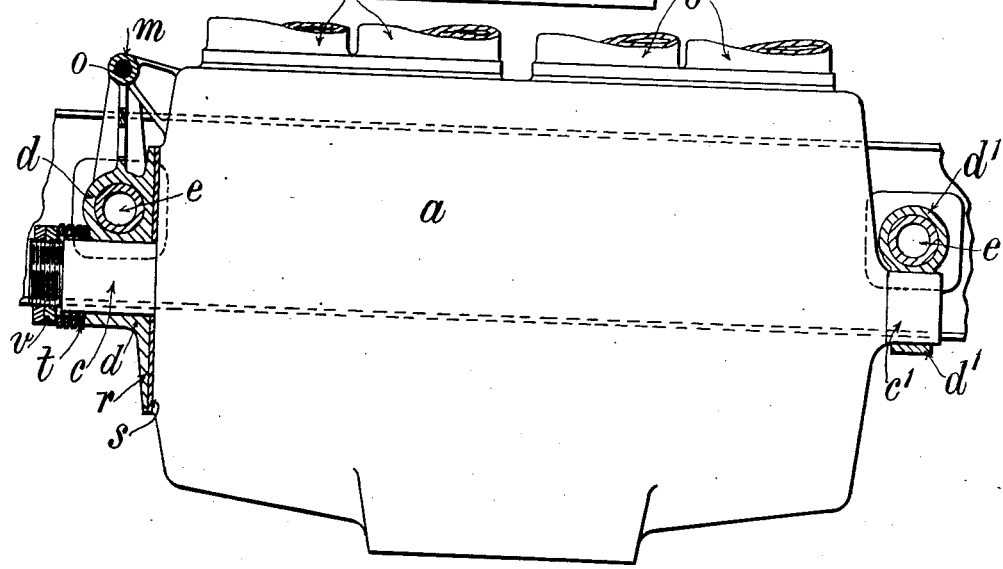

In the accompanying drawing which shows an engine mounted in accordance with this invention and in which the longitudinal axis about which the engine rocks coincides with the longitudinal axis of the crankshaft:—Figure 1 is a view in front elevation, and Fig. 2 is a view in side elevation.

In both views similar parts are marked with like letters of reference.

The crank-chamber $a$ of the engine, on which are mounted the cylinders $b$, is provided with fore and aft extensions or trunnions $c$ and $c^1$ which are carried in housings or bearings $d$ and $d^1$ carried by cross tubes $e$ which are rigidly fixed to the side members $x$ so as to form parts of the frame of the vehicle. The extensions or trunnions and their housings or bearings are preferably arranged concentric with the crankshaft of the engine, but this is not obligatory. The engine is kept in a vertical position by means of suitable springs $h$ acting on each side of an arm or bracket $m$ carried by the crank-chamber $a$, the outer ends of the springs abutting against arms or brackets $n$ carried by the cross tube $e$. The arms or brackets $n$ carry a bolt or pin $o$ which passes through the arm or bracket $m$ and serves to retain the springs $h$ in their working positions, the hole in the arm or bracket $m$ being of such a size that the arm or bracket $m$ will not contact said bolt or pin $o$ during the oscillations of the engine.

Between the housing or bearing $d$ and the adjacent face of the crank-chamber $a$ is interposed a friction damper, which comprises a disk $r$ formed on or carried by the housing or bearing $d$, a suitable friction face $s$ on the adjacent face of the crank-chamber, and a spring $t$ mounted on the extension or trunnion $c$ which by abutting against an adjustable nut $v$ screwed on said extension or trunnion operates to create friction between the engine and the frame. It will be seen that by this construction before any movement of the engine can take place the frictional resistance between the disk $r$ and the friction face $s$ must be overcome, the result of which is that the engine is prevented from getting into a state of oscillation due to the recoil of the springs $h$.

It will be obvious that the controlling springs and the friction damper can be arranged at either or both ends of the crank-chamber, or that one can be arranged at one end of said chamber and the other at the other end, and, further, that any other form of the spring anchoring device or friction damping device may be employed without departing from the spirit and scope of this invention.

Although this invention has been hereinbefore referred to as applied to engines, it can be applied to any other parts of the power or transmission mechanism of motor vehicles in which vibration from reaction in a rotary direction can arise.

What I claim as my invention and desire to secure by Letters Patent is:—

1. In a motor vehicle, the combination of a power or transmission unit mounted in the frame thereof so that it can rock about its longitudinal axis, of springs controlling the movement of said unit about said axis, and of a friction damper operating between said unit and said frame.

2. In a motor vehicle the combination of a power or transmission unit mounted in the frame thereof so that it can rock about a longitudinal axis passing through its center of gravity, of springs for controlling the movement of said unit about said axis, and of friction dampers operating between said unit and the frame.

3. In a motor vehicle an engine mounted in or on its frame so as to be free to rock about its longitudinal axis, springs operating between the engine and the frame to limit and control said movement, and means for producing friction between the relatively moving parts of the engine and frame, as set forth.

4. In a motor vehicle, the combination of fore and aft trunnions formed on or carried by the crank-chamber of the engine, of housings or bearings carried by the side members of the frame and adapted to receive said trunnions, of springs operating directly between the engine and the frame for controlling the rotary motion of the engine, and of a frictional device operating directly or indirectly between the engine and the frame for damping said motion.

5. In a motor vehicle, the combination with the engine and frame of the vehicle, of cross tubes supported by the side members of the frame, fore and aft trunnions formed on said engine, bearings carried by said cross tubes adapted to receive said trunnions, and spring means operating between said bearings and said engine for limiting the rotary motion of said engine.

6. In a motor vehicle, the combination with fore and aft trunnions carried by the engine, of bearings adapted to receive said trunnions, spring means carried by one of said bearings for limiting the rotary movement of the engine and a friction damper between said last mentioned bearing and the engine as and for the purpose described.

In testimony whereof I have signed my name in the presence of two subscribing witnesses.

FREDERICK HENRY ROYCE.

Witnesses:
  C. POPPLETON,
  M. OLLEY.